Patented Nov. 16, 1937

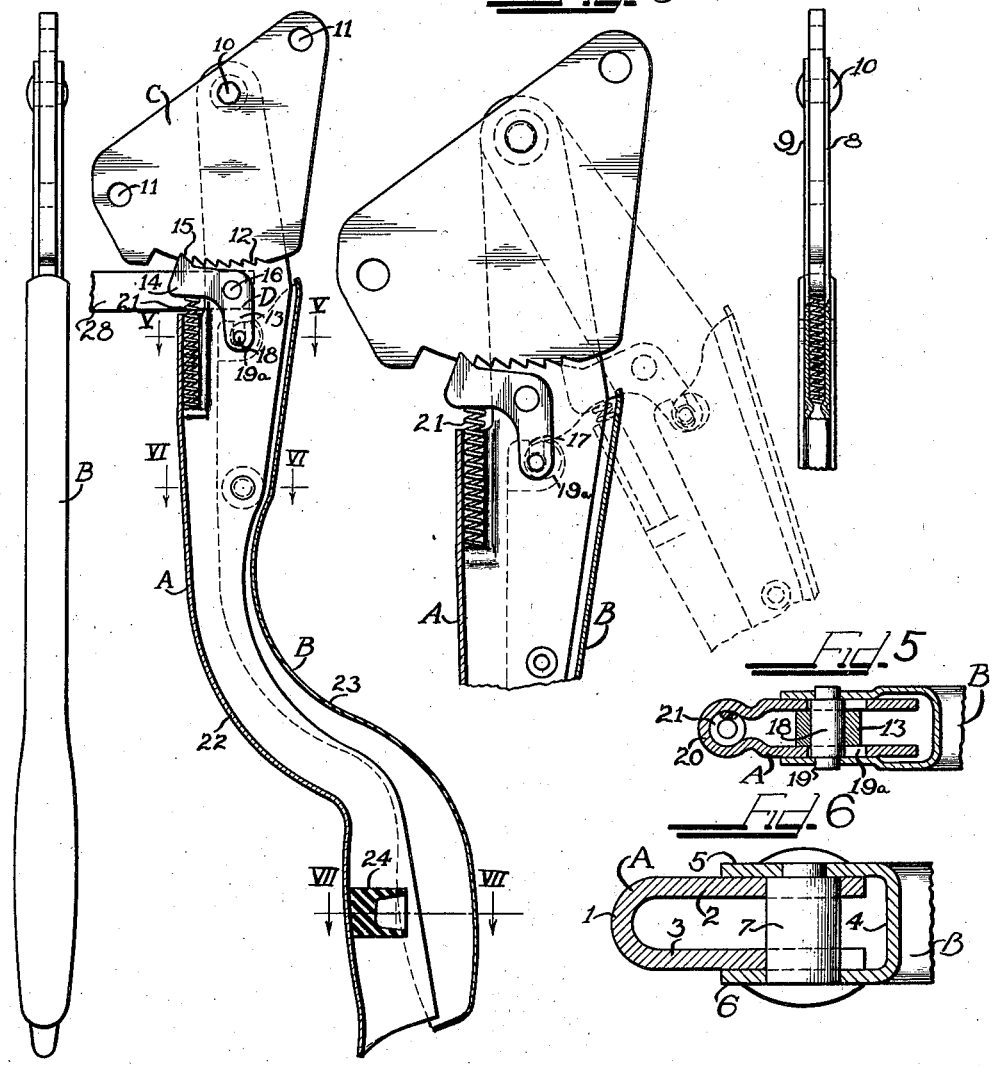

2,099,233

UNITED STATES PATENT OFFICE 2,099,233

BRAKE LEVER CONSTRUCTION

Ray A. Sandberg, Waukegan, Ill., assignor to Oakes Products Corporation, North Chicago, Ill., a corporation of Michigan Application November 16, 1936, Serial No. 110,971

5 Claims. (Cl. 74—537)

The present invention relates to brake lever construction, and more particularly to dash type brake levers fashioned from double stampings, to form the levers proper and the pawl actuating members.

An object of the present invention is to provide a brake lever constructed of stamped metal parts, in one of which is fashioned a housing for a pawl spring.

Another object of the present invention is to provide a brake lever construction including a stamped metal lever proper in which a spring housing is fashioned during the formation of the lever.

A further object of the present invention is to provide brake lever construction including a lever in which is housed a pawl spring, so arranged as to act against the pawl in substantially the direction of length of the lever.

A still further object of the present invention is to provide a pawl and ratchet type brake lever construction in which the pawl spring is housed in the lever proper and a housing fashioned during the formation of the lever proper from sheet material.

The invention has for a further object a brake lever construction of stamped parts so made and arranged as to minimize the obviousness of the moving parts.

The invention has for another object the provision of brake lever construction including a stamped metal lever properly fashioned to provide a housing for a pawl spring, and a pawl so disposed with respect to the spring housing that the pawl spring acts directly against the pawl with push action to maintain the pawl in latched engagement with its ratchet.

The above, other and further objects of the present invention will be apparent from the following description and accompanying drawing.

Figure 1 is an elevational view of a brake lever constructed in accordance with the principles of the present invention.

Figure 2 is a view, partially in elevation and partially in longitudinal section, of a brake lever constructed in accordance with the principles of the present invention, and showing the parts in normal or latched relation.

Figure 3 is a fragmental view of the upper end of the lever of Figure 2, showing in full lines the position of the parts when the pawl is in latched engagement with its ratchet, and in dotted lines, the lever swung and the detent of the pawl atop of the crest of one of the teeth of the ratchet.

Figure 4 is a fragmental view, partially in elevation and partially in section through the spring housing, of the illustrated form of the lever.

Figure 5 is an enlarged transverse sectional view taken substantially in the plane indicated by line V—V of Figure 2.

Figure 6 is an enlarged transverse sectional view taken substantially in the plane indicated by line VI—VI of Figure 2.

Figure 7 is an enlarged transverse sectional view taken substantially in the plane indicated by line VII—VII of Figure 2.

The drawing will now be explained.

The form of lever chosen to exemplify the present invention includes a lever proper A and an actuating member B, both fashioned from sheet material into substantially U-shape, in cross section, and are assembled with the webs in opposition and the walls of one snugly fitting the walls of the other, so that the actuating member may be guided on the lever proper whenever it is operated in service.

The brake lever proper A as formed has a web portion 1 and side walls 2 and 3, while the actuating member B has a web portion 4 and side walls 5 and 6. As the parts are assembled, the walls 5 and 6 of the actuating member B overlap the walls 2 and 3 of the brake lever A. The parts A and B are pivoted together by a pin 7, which pivotal point is nearer the pivoted end of the lever than it is its free end.

The walls of the lever proper A are extended to provide legs 8 and 9 which straddle a ratchet plate C, with the ends of the legs pivoted to the ratchet plate by a pin 10. The ratchet plate C is provided with suitable apertures 11 through which bolts or rivets may pass for securing the plate to a suitable support.

The lever of the present invention has herein been illustrated as a lever of the dash type, that is, a lever adapted to have its ratchet plate C attached to a bracket supported on the dashboard of a vehicle behind the instrument board, with the lever depending or hanging from the ratchet plate in such manner that, when in released position, the lever will lie behind the plane of the instrument board and thus be out of the way.

The lower margin of the ratchet plate C is provided with teeth 12, constituting a ratchet.

A pawl D which is substantially right angular in plan has legs 13 and 14, the latter of which is provided with a detent or point 15 for entering one of the teeth 12 of the ratchet to latch the lever in desired or set position with respect to the ratchet plate C. The detent D is pivoted to the legs of the lever proper A by a pivot 16 at the angle of the legs 13 and 14. The leg 13 of the pawl extends generally in the direction of the length of the lever proper A.

The extremity of the actuating member B, adjacent the pawl, is provided with slots 17 which extend in the direction of the length of the actuating member. The extremity of the leg 13 of the pawl D carries a pin 18, the ends of which are preferably reduced in diameter, as at 19, to ride in the slots 17 formed in the walls of the actuating member B. In order to permit movement of the pawl D about its pivot 16, the walls of the lever proper A are apertured, as at 19a, to permit rocking of the pawl D by its actuating member B.

In the formation of the brake lever proper A portions of the walls thereof are fashioned to provide a spring housing 20, in the lever proper A. The housing is open at one end, that is the end adjacent the ratchet plate C, and is adapted to receive a compression spring 21.

The pawl D is so arranged and disposed, that its leg 14 is in line with the open end of the housing 20 and substantially normal to the housing, so that the compression spring 21 acts with push action directly against the leg 14 of the pawl, that is, acts against the pawl in a direction of the length of the lever A.

The spring 21 being a compression spring, normally acts against the leg 14 of the pawl D to maintain the detent 15 of the pawl in latched engagement with the ratchet of the ratchet plate C. At the same time the spring is effective to maintain the lever in any set position to which it may be moved by reason of the latching engagement between the pawl and the ratchet. Furthermore, the action of the spring 21 tends to maintain the handle portion of the actuating member B spaced slightly from the handle portion of the lever proper A to permit squeezing movement of the handle portion of the actuating member B towards the handle portion of the lever A, when it is desired to unlatch the pawl.

The lever proper A, as well as the actuating member B, are formed with goose neck portions 22 and 23 respectively so that when the lever is swung in a position to apply the brakes, the handle portion thereof will move underneath the lower margin of the instrument board, without the lever striking the instrument board.

In operation, when it is desired to move the lever to apply the brakes, the operator grasps the rear or left hand surface of the handle portion of the lever proper A, and moves it in counter-clockwise direction, as viewed in the drawing. During such movement the detent 15 of the pawl will ride over the crests of the several teeth of the ratchet until the lever has been moved to desired position, whereupon the spring 21 forces the detent 15 of the pawl into engagement with one of the notches of the ratchet thus latching the lever in its then position.

To release the lever from applied position, the operator grasps the handle portions of the lever proper A and the actuating member B, and by a squeezing action, rocks the pawl D so that its detent 15 is moved out of its then engaged notch, whereupon, with the handle portion still squeezed, the lever is returned to off or released position.

The pin and slot connection between the pawl D and the actuating member B, permits rocking of the pawl in the manner described, with minimum squeezing effort applied to the handle portions of the lever and actuating member. Furthermore the pivotal connection of the members A and B, is such that with slight movement of the handle portion of the actuating member B, sufficient pressure may be applied to rock the pawl D, no matter how tightly the brake may be set.

In order to prevent rattling of the parts A and B, any suitable anti-rattle means may be interposed.

The anti-rattle means herein illustrated comprises a button 24 of rubber or rubber composition or of any other suitable resilient material, which button is illustrated as inserted in the trough of the handle portion of the brake lever proper A. The button 24 has lateral projections 25 which pass through apertures 26 in the walls 2 and 3 of the lever proper A and extend beyond these walls to bear against the inner surfaces of the walls 5 and 6 of the actuating member B. Thus the button 24 is effective to prevent rattling between the parts A and B.

In order to assure sufficient resiliency, the button may be hollowed, as at 27, to increase flexibility in the action of the projections 25.

It will readily be observed, from an inspection of the drawing, that the lever construction of the present invention is one in which the obviousness of the moving parts is reduced to a minimum. The spring 21 is almost completely housed, so that but a slight portion of the same appears visible, and the construction of the lever proper A and the actuating member B is such, as to make these parts appear rather indistinctly as separate parts.

A yoke 28 is pivoted on the pin 16 of the pawl D for connection between the brake lever and the brake mechanism of the automotive vehicle.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Brake lever construction including a lever proper and an actuating member formed as double U-shaped stampings and assembled in pivoted relation with the webs in opposition and the walls of one snugly fitting against the walls of the other, a right angular pawl pivoted to the lever proper with one leg extending generally in the direction of the length of the lever and having sliding engagement with said actuating member, and a compression spring housed in the lever proper and bearing against the other leg of the pawl at substantially right angles to said leg to exert a direct push against said leg to maintain the pawl in latched engagement with a ratchet and to maintain said lever in one position.

2. A brake lever construction including a lever proper and a pawl actuating member formed as double U-shaped stampings and assembled in pivotal relation with the webs in opposition and the walls of one snugly fitting against the walls of the other, a pawl pivoted to said lever proper, a compression spring carried by the lever proper and acting against the pawl with push action to maintain the pawl in latched engagement with a ratchet, and said pawl and said pawl actuating member having cooperating pin and slot connections to rock said pawl to unlatch it from its ratchet when said actuating member is rocked in one direction.

3. Brake lever construction including a ratchet plate, a lever pivoted to said plate to swing, a pawl pivoted to said lever, a pawl actuating member pivoted to said lever and having a notch, said pawl carrying a pin working in said notch for rocking said pawl to unlatch it from its ratchet when said actuating member is rocked in one direction, and a spring housed in said lever and acting against said pawl in the direction of the length of the lever to normally retain the pawl in latched engagement with its ratchet.

4. Brake lever construction including a ratchet plate, a lever pivoted to said plate to swing, an angular pawl pivoted at its angle to said lever and having one leg extending generally in the direction of the length of the lever, said leg carrying a pin near its free end, a pawl actuating member pivoted to said lever and having a notch extending in the direction of the length of said actuating member to receive the said pawl pin in working relation, and a spring housed in said lever and acting against the other leg of said pawl in the direction of the length of the lever to normally retain said pawl in latched engagement with its ratchet.

5. A brake lever construction including a ratchet plate, a lever pivoted to said plate to swing, an angular pawl pivoted at its angle to said lever and having one leg extending generally in the direction of the length of the lever, said leg carrying a pin near its free end, a pawl actuating member pivoted to said lever and having a notch extending in the direction of the length of said actuating member to receive the pawl pin in working relation, and a spring acting against said pawl to normally retain it in latched engagement with said ratchet plate.

RAY A. SANDBERG.